United States Patent [19]

Dugot

[11] 4,287,771

[45] Sep. 8, 1981

[54] VEHICLE PASS-BY AND COMMUNITY NOISE MONITOR

[75] Inventor: Richard Dugot, New York, N.Y.

[73] Assignee: Instrument Development Corp., South Hackensack, N.J.

[21] Appl. No.: 88,762

[22] Filed: Oct. 29, 1979

[51] Int. Cl.³ .............................................. G01H 3/12
[52] U.S. Cl. .................................................... 73/647
[58] Field of Search ................. 73/645, 646, 647, 648; 179/1 N

[56] References Cited

U.S. PATENT DOCUMENTS

| | | | |
|---|---|---|---|
| 3,661,224 | 5/1972 | Allen et al. | 73/647 |
| 3,696,206 | 10/1972 | Ida et al. | 73/648 |
| 3,778,552 | 12/1973 | Edinborgh | 73/648 |
| 3,802,535 | 4/1974 | Peake et al. | 73/647 |

Primary Examiner—Stephen A. Kreitman
Attorney, Agent, or Firm—Felix L. D'Arienzo, Jr.

[57] ABSTRACT

The disclosure is related to a sound level meter including unique features for measuring, storing and displaying a maximum sound level generated by a passing motor vehicle or the like. The meter operates as an ordinary sound level meter until a predetermined threshold noise level is reached, at which time a novel circuit continuously detects the incoming sound level and electrically stores the maximum value detected. A comparison means compares the incoming sound level with the maximum stored level. When the incoming sound level decreases by a predetermined amount below the maximum stored value, a circuit is energized to lock the maximum value detected in a memory device. Additional means are provided to visually display the stored value.

12 Claims, 4 Drawing Figures

FIG.1A

VEHICLE PASS-BY AND COMMUNITY NOISE MONITOR

SUMMARY AND BACKGROUND OF THE INVENTION

The present invention is directed to a continuous range dynamic sound level meter with unique features to detect, store and visually display a maximum sound level caused by a passing motor vehicle or the like which is above a predetermined noise threshold level.

In response to an increasing concern among members of the general public and the quality of the environment, many governmental authorities have enacted laws to restrict and regulate activities which may have a harmful effect on the environment. One area of official scrutiny and regulation is noise pollution. Large numbers of operating motor vehicles and other types of machinery and construction equipment may severely detract from the enjoyment of, for example, an urban neighborhood by generating excessive noise. Accordingly, many governmental authorities have enacted legislation setting noise level standards which must be observed by persons operating motor vehicles and the like. However, a problem associated with noise pollution regulation is enforcement and, in particular, the availability of a reliable, accurate and easy-to-operate device to measure noise levels and detect noise violations.

It is a primary objective of the present invention to provide a dynamic range electronic noise level meter with novel circuit means for detecting and holding a noise input which is above a threshold level set in accordance with official regulations. The detect-and-hold circuit means is initially activated by a noise level above the predetermined threshold level and operates to continuously store the maximum incoming noise level. Moreover, the circuit means compares the incoming noise level to the stored maximum level and "locks" the stored maximum level if the incoming level falls below a predetermined amount, e.g., 6 dB, with respect to the stored maximum. Additional display means are provided to visually display the stored maximum level detected by the device of the invention during a detect-and-hold sequence.

In the operation of the device, a microphone electrically connected to the sound meter is placed in close proximity to, for example, a highway or street. In this manner, the meter will detect and display the noise level in the vicinity of the highway. However, when a passing vehicle generates an impermissible noise level it will trigger the detect-and-hold circuit means so that the device will then function to continuously monitor and store the maximum incoming sound caused by the passing vehicle until the vehicle has passed and the noise level in the vicinity of the device microphone falls below a predetermined level in accordance with regulations. At that time, the circuit means will "lock" the maximum sound level caused by the vehicle and visually display the maximum reading. Accordingly, the "locked" condition represents scientific measurement evidence of a noise pollution violation.

In accordance with another feature of the invention, a beeper and indicator light are activated by the detect-and-hold circuit means at the commencement of a detection sequence to alert the operator to the presence of a possible violation. Moreover, an additional light indicator is activated at the end of a detect-and-hold sequence to signal the completion of the cycle and indicate that the visual display is a valid violation of noise pollution regulations.

For a better understanding of the above and other features and advantages of the present invention, reference should be made to the following detailed description of a preferred embodiment of the invention and to the accompanying drawings.

DETAILED DESCRIPTION OF A PREFERRED EMBODIMENT

Referring now to the drawings of FIGS. 1, 1A, 1B and 1C, there is illustrated in a schematic circuit wiring diagram a noise monitor built in accordance with the invention. Leads 10, 11 are connected respectively to the positive terminal and ground terminal of a 12 v DC voltage source, such as an automobile battery (not shown). Line 10 is connected through a fuse to a terminal 12 of a double-throw, three-way switch S1, which is operable to be set in an off mode, an on-day mode or an on-night mode. In the circuit diagram, the switch S1 is set in the off mode, wherein the switch contacts 13, 14 are each connected to an open terminal. During night operation, the switch S1 is operated such that switch contact 14 is connected to lead 15 to provide an electrical conduction path through light bulbs 16 to ground lead 11 and switch contact 13 is connected to leads 17, 18. The lead 17 extends to the fixed terminal of switch contact 14, whereby there is a closed electrical circuit between the positive 12 volt terminal and ground line 11 through the light bulbs 16.

In the on-day mode, switch contact 13 is moved to a second contact terminal with leads 17, 18 and switch contact 14 is thrown to a second open terminal. In either on-mode, switch contact 13 is connected to the lead 18, which is suitably wired to the input terminal of a Reliability, Inc. Model V12R 15-15 power supply designated generally by the reference numeral 19. Lead 18 is also connected to ground lead 11 through a capacitor C1 and Zener diode D1 by leads 20, 21, respectively. The power supply 19 is appropriately wired to ground lead 11 by lead 22 and includes output leads 23, 24 with fixed DC voltages of +15 volts and −15 volts, respectively.

In order to facilitate the engineering and manufacturing of the noise monitor, commercially available integrated circuit chips and other components are utilized for all of the major elements of the device. To that end, each of the circuit block diagrams designated in the schematic diagram as 1A, 1B, 2A, 2B, etc. comprise electronic components of the following standard, commercially available electrical devices:

| Manufacturer | Model No. | Corresponding Block Components of Figs. 1, 1A, 1B, 1C |
|---|---|---|
| Signetics (Sunnyville, Calif.) | NE 5532F | 1A, 1B |
| Texas Instrument | TL 074 | 2A, 2B, 2C, 2D |
| Nation Semiconductor | LM 358 | 6A, 6B, 7A, 7B, 9A, 9B |

| Manufacturer | Model No. | Corresponding Block Components of Figs. 1, 1A, 1B, 1C |
|---|---|---|
| RCA | CD 4013 | 8A, 8B |

Moreover, the pin number designations for each component of the schematic diagram herein correspond to the pin reference numbers used by the manufacturers on the actual units to facilitate a simplified cross reference between the present description and the commercially available components utilized to practice the teachings of the present invention.

A Model AD 536 RMS/Log converter, manufactured by Analog Devices, is designated by the reference numeral 100 and is wired such that pin 3 is connected to the −15 volt supply through lead 24, pin 14 is connected to the +15 volt supply through lead 23 and pin 4 is connected to lead 23 through a capacitor C2. Pins 9 and 10 are each connected to ground lead 11 and pins 5 and 7 are connected to a reference voltage voltage generator 101 through a variable resistor R102 in accordance with the manufacturer's operating instructions whereby the variable lead 103 of the resistor R102 may be operated to calibrate the converter output voltage at pin 6. In this manner, the converter unit 100 will be operable to convert an RMS voltage input applied at pin 1 (which corresponds to the sound level picked up by the microphone as will appear) to a DC voltage output at pin 6 related logarithmically to the RMS voltage input. The AD 536 unit used as the converter 100 in the preferred embodiment of the invention has a dynamic range of 60 dB (1000:1) and has an input voltage range of from 7 MV to 7 volts. The converter 100 is calibrated to operate in the circuit of FIG. 1, such that an RMS input voltage at pin 1 of 700 MV yields 0 volts at output pin 6. In accordance with the logarithmic relationship between the input voltage and output voltage of the converter 100, the maximum input of 7 volts (10×700 MV) will yield an output of 1 volt and the minimum input of 7 MV (0.01×700 MV) will yield an output of −2 volts and so on.

Figure 1:
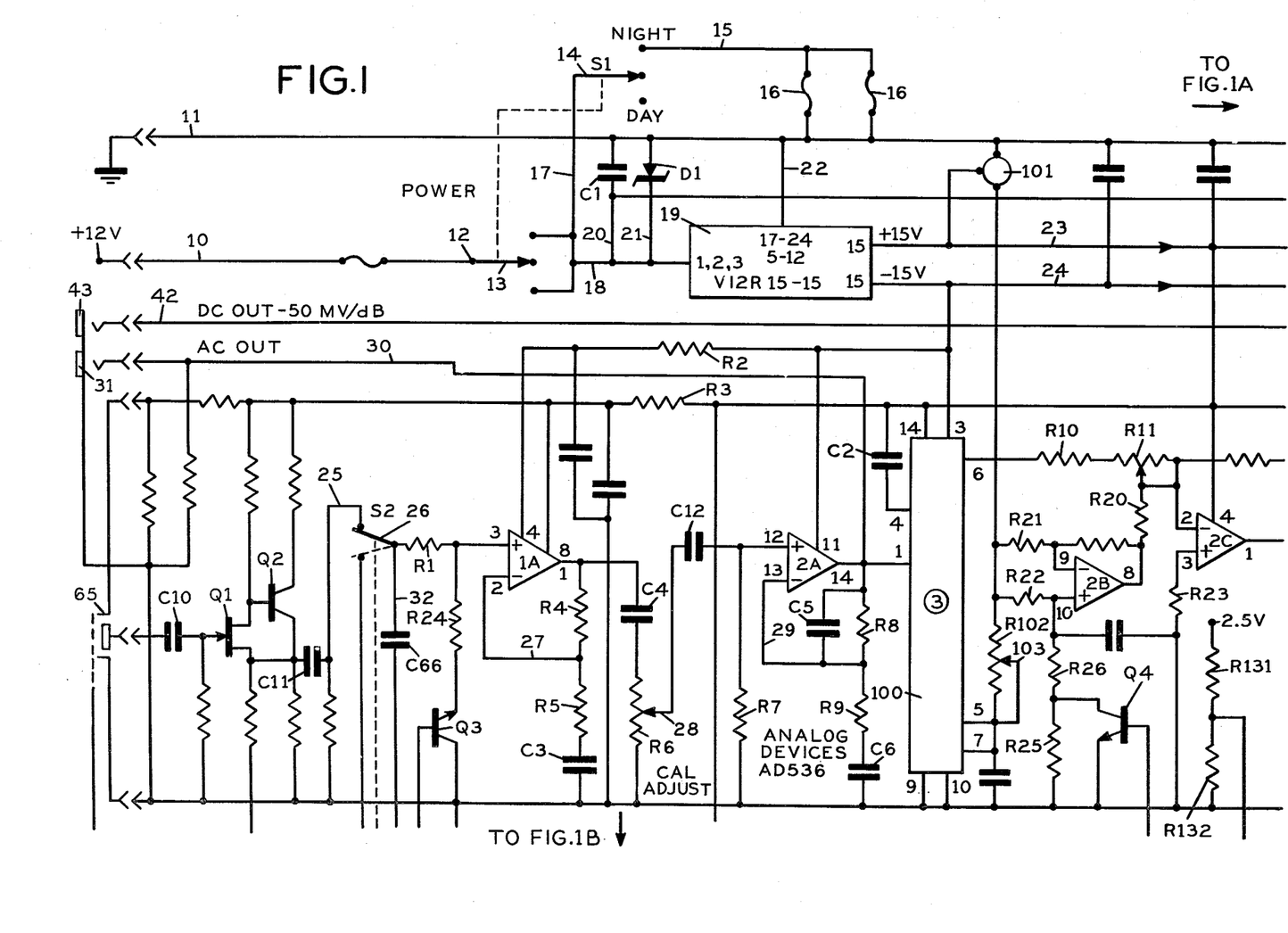
FIGS. 1, 1A, 1B and 1C are to be placed in a side-by-side relation and illustrate, in schematic diagram form, a circuit for a noise monitor built in accordance with the invention.
Figure 1A:
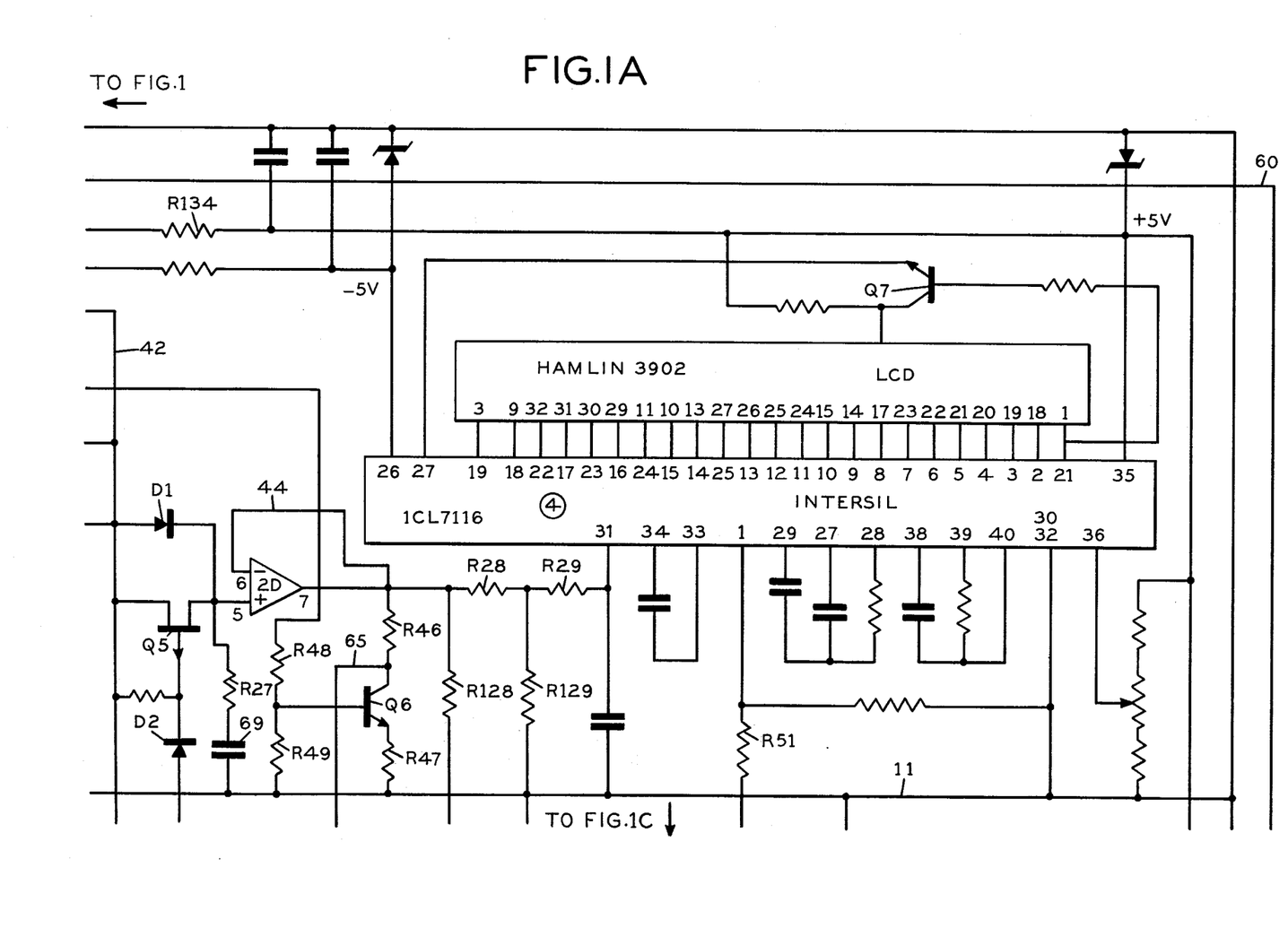
Figure 1B:
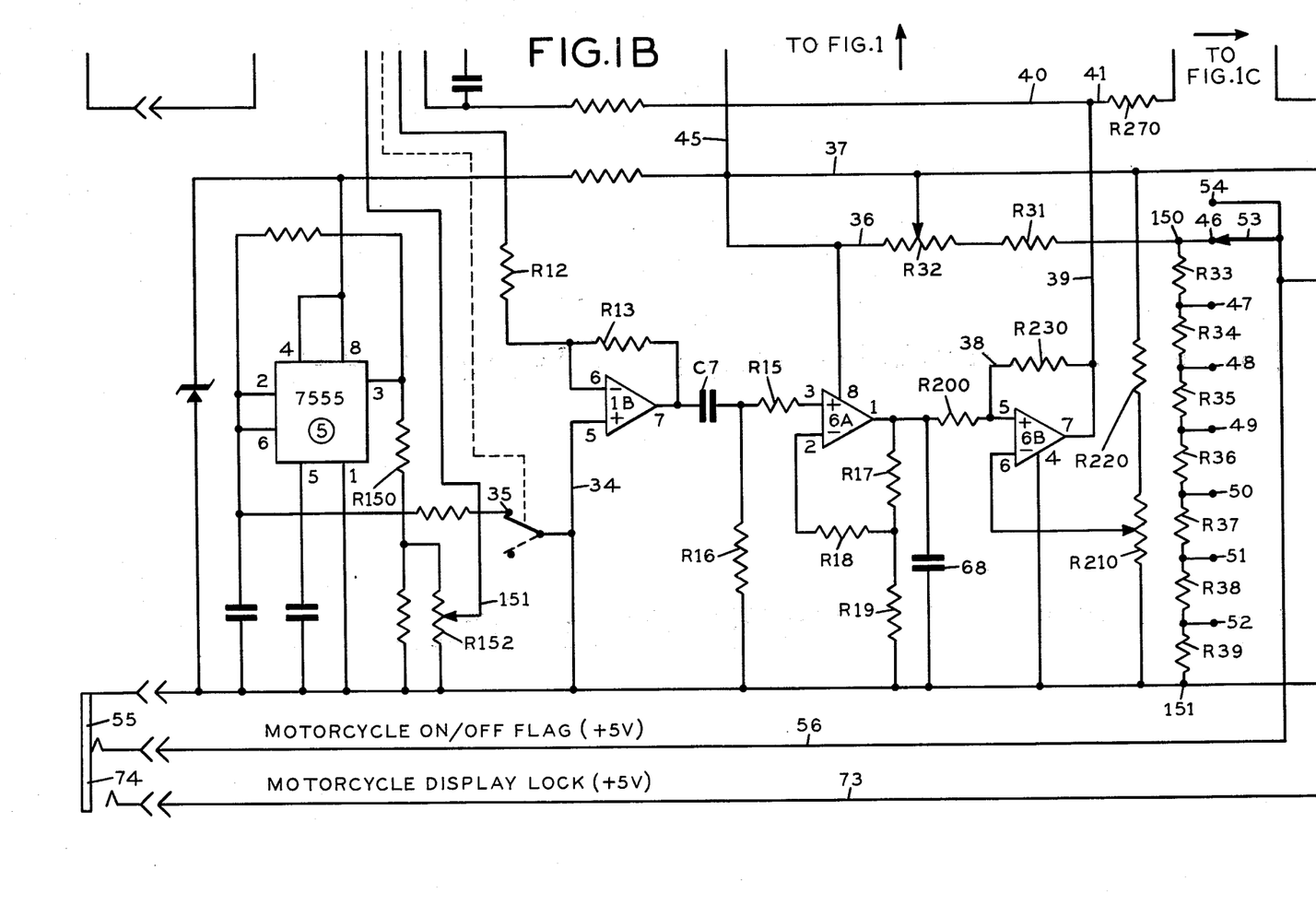

Referring now to FIGS. 1 and 1B, a double throw, two-way switch S2 is operable to be set in either a sound meter mode or in a calibration mode. The calibration mode is illustrated in a dash line form and connects the output pin 3 from an Intersil Model 7555 wired as a square wave generator through a resistor R150 and slide lead 151 of a variable resistor R152 to switch contact 26 of the switch S2. The Intersil 7555 generator will thereby provide a highly accurate input signal to the RMS/Log converter 100 through amplifiers 1A and 2A, as will be more fully described hereinafter, whereby the variable resistor R6 may be operated to calibrate the sound meter. For proper operation, the remaining pins 1, 2, 4, 5, 6 and 8 of the 7555 generator are wired to each other, ground lead 11 and lead 23 substantially as illustrated in the schematic diagram of FIG. 1B.

when the switch S2 is in the sound meter mode, the signal developed by the microphone is conducted through a jack 65 and capacitor C10 to the gate of transistor Q1. The transistors Q1 and Q2 are wired as illustrated in FIG. 1 to act as a high input impedance unity gain buffer amplifier providing a suitable coupling of the microphone signal for further amplification by the integrated circuit amplifiers 1A and 2A used herein. The output of transistor Q2 is connected through a capacitor C11 to lead 25 which is connected to contact 26 of the switch S2. The switch contact 26 is connected through resistor R1 to input pin 3 of amplifier 1A. In order to energize and properly bias the amplifier 1A, pin 4 is connected through a resistor R2 and lead 24 to the −15 volt supply and pin 8 is connected through a resistor R3 and lead 23 to the +15 volt supply. Moreover, pin 2 is connected through a feedback lead 27 and a resistor R4 to the output pin 1. The feedback lead 27 is also connected through resistor R5 and capacitor C3 to ground lead 11.

The output pin 1 of the amplifier 1A is connected through a capacitor C4 and variable resistor R6 to ground lead 11. An adjustable contact 28 of the variable resistor R6 is connected through a capacitor C12 to the input pin 12 of the amplifier 2A whereby the output from the amplifier 1A is fed to the input stage of the amplifier 2A. A resistor R7 is wired between the input pin 12 and the ground lead 11 and pin 11 of the amplifier 2A is connected to the −15 volt supply through lead 24. A feedback lead 29 is connected from input pin 13 through parallel wired resistor R8 and capacitor C5 to output pin 14 of amplifier 2A, and through a resistor R9 and capacitor C6 to ground lead 11.

To advantage, the gain of the amplifiers 1A and 2A is such that an output voltage from the microphone corresponding to an 80 dB sound level will generate a voltage of 700 MV RMS at output pin 14 of amplifier 2A and the output range of the amplifiers 1A and 2A is from 7 MV to 7 volts RMS. Lead 30 is connected between output pin 14 and a jack 31 to provide an AC voltage output from the sound meter corresponding to the measured sound.

In accordance with the invention, output pin 14 of amplifier 2A is connected to pin 1 of the RMS/Log converter 100. As discussed above, this will drive the converter 100 to provide a DC output voltage logarithmically related to the RMS input and, therefore, correspond to a decibel measurement of the sound picked up by the microphone. The DC output voltage at pin 6 of the converter 100 is connected through resistor R10 and variable resistor R11 to input 2 of a summation amplifier 2C. In the preferred design of the present invention, the output pin 1 of summation amplifier 2C is set at a scale of 50 MV DC/dB. Accordingly, if the input voltage at pin 1 of converter 100 is 700 MV RMS and corresponds to 80 dB, the output at pin 1 of summation amplifier 2C must be 4 volts DC (50 MV/dB×80 dB=4 volts).

However, the converter 100 is set such that a 700 MV RMS input causes a 0 volt output at pin 6 of the converter 100. Therefore, the output pin 8 of a compensation amplifier 2B is wired through a resistor R20 to provide a constant reference voltage to the input pin 2 of the summation amplifier 2C. The input pins 9, 10 of the amplifier 2B are connected through the resistors R21 and R22, respectively, to the reference voltage generator 101 such that the output reference voltage at pin 8, when summed by the summation amplifier 2C with the output from the converter 100 results in a constant 4 volt addition to the output of the converter 100 as measured at output pin 1 of the summation amplifier 2C. Moreover, the adjustable lead of the variable resistor 11 is connected to output pin 8 of the amplifier 2B to permit an accurate adjustment of the output voltage of the summation amplifier 2C. For energization and proper biasing of the summation amplifier 2C, pin 4 is connected through lead 23 to the +15 volt supply and input pin 3 is connected through resistor R23 to ground lead 11.

In this manner, the constant 4 volts is summed with the output of the converter 100 to maintain the 50 MV/db scale. For example, if the output at pin 14 of amplifier 2A fell tenfold from 700 MV to 70 MV, this should correspond to a 20 dB drop in measured sound level, from 80 dB to 60 dB. As discussed above, the RMS/Log converter 100 will produce a $-1$ volt output at pin 6 when there is a 70 MV RMS input. The $-1$ volt is summed by amplifier 2C with the constant 4 volt effect of compensation amplifier 2B, whereby the output at pin 1 of amplifier 2C is 3 volts (corresponding to 60 dB on the 50 MV/dB scale).

With an input range to the converter 100 of from 7 MV to 7 volts, the summation amplifier 2C will have a logarithmic DC output range of from 2 to 5 volts DC corresponding to a dynamic sound range of from 40 to 100 dB. However, for practical purposes, it is desired to have a dynamic sound measuring range of from 40 to 140 dB. Accordingly, an automatic scale adjust circuit is provided to extend the measurable sound levels up to 140 dB.

Referring once again to switch contact 26 of switch S2, lead 32 is connected through capacitor C66 and resistor R12 to the input pin 6 of an amplifier 1B. A feedback lead 33 connects input pin 6 through resistor R13 to output pin 7 and input pin 5 is wired through lead 34 to ground lead 11. Moreover, when the sound meter is in the operate mode, the 7555 generator is shut off by means of grounding pins 2, 6 of the 7555 unit through switch contact 35 of switch S2. The output at pin 7 of amplifier 1B is fed through capacitor C7 and resistor R15 to input pin 3 of amplifier 6A and is also wired through capacitor C7 and resistor R16 to ground lead 11.

Pin 8 of amplifier 6A is connected through lead 36 and lead 45 to lead 23 and is thereby energized by the $+15$ volt supply. A feedback lead connects output pin 1 of amplifier 6A through resistors R17 and R18 to input pin 2 and resistor R19 is connected from a point in between the resistors R17 and R18 to ground lead 11. A capacitor C8 is wired from output pin 1 to ground lead 11. The output from amplifier 6A is proportional to the output from pin 14 of amplifier 2A and may therefore be used as a reference source to determine when the RMS input voltage to the RMS/Log converter 100 exceeds 7 volts (the maximum input to the converter 100).

To that end, the output from pin 1 is fed through resistor R200 to pin 5 of a comparator 6B. Pin 6 of the comparator 6B is connected to a sliding contact of a variable resistor R210, the fixed terminals of which are wired to the $+15$ volt source through leads 23, 45 and 37 and resistor R220 and to the ground lead 11. In this manner, a predetermined reference voltage at input pin 6 may be used as a switching reference in relation to the proportional voltage at pin 5. When the voltage at pin 5 exceeds the voltage which is proportional to a 7 volt RMS input to the RMS/Log converter 100, the voltage will also be greater than the predetermined reference voltage and the comparator 6B will be switched on to provide a switching voltage output at pin 7. A feedback lead 38 connects pin 7 through resistor R230 to input pin 5 and pin 4 of the comparator 6B is connected to ground lead 11. Output pin 7 is also connected through lead 39 to leads 40 and 41.

A normally non-conducting transistor Q3 is wired such that the emitter thereof is connected through resistor R24 to input pin 3 of amplifier 1A and the collector is connected to ground lead 11. When transistor Q3 is conducting it will cause a 100:1 attenuation of the input to amplifier 1A which results in 40 dB equivalent voltage drop at the output of the RMS/Log converter 100. The base of transistor Q3 is connected to lead 40 and, accordingly, the transistor Q3 will be switched on only when there is an output from comparator 6B, i.e., when the input to the RMS/Log converter 100 exceeds 7 volts.

The 100:1 attenuation of the input signal therefore extends the output capability of the RMS/Log converter 100 by 40 dB. In order to compensate for the 40 dB drop in output from the RMS/Log converter 100 and provide continuation of the 50 MV/dB output at summation amplifier 2C, a normally non-conducting transistor Q4 is connected in parallel to resistor R25 which is connected through resistor R26 to input pin 10 of the compensation amplifier 2B. As described above, the compensation amplifier 2B normally causes a constant 4 volt addition to the output of the summation amplifier 2C. However, when the scale adjustment input attenuation transistor Q3 is activated, Q4 is also activated through a connection from the base thereof and resistor R270 to lead 41 and, accordingly, to output pin 7 of the comparator 6B. when Q4 is conducting, the output effect of the compensation amplifier 2B is increased by 2 volts to a total of 6 volts. The extra 2 volts, on the 5 MV/dB scale, compensates for the 40 dB drop at the output of the RMS/Log converter 100.

Accordingly, as should be understood, the above-described circuitry provides a DC output at pin 1 of summation amplifier 2C corresponding on a 50 MV/dB scale to the sound level detected by the microphone. To advantage, lead 42 is connected from pin 1 to a jack 43 so that additional equipment, such as a recording device, may be connected to the sound meter for direct decibel recording of the sound level at sensitivity of 50 MV/dB. Moreover, the device of the invention includes an Intersil Model 1CL 7116 analog to digital convertor unit and a Hamlin Model 3902 LCD digital display unit so that the DC voltage output of the summation amplifier 2c may be visually displayed to the operator. These components are wired to each other and to the power supply of the device as clearly illustrated on the circuit schematic of FIG. 1A.

In accordance with the invention, the output of pin 1 of the amplifier 2C is connected to input pin 5 of a high input impedance voltage follower 2D through parallel wired low leakage diode D1 and normally conducting transistor Q5. Moreover, input pin 5 of amplifier 2D is connected to ground lead 11 through an RC circuit comprising resistor R27 and capacitor C9. Output pin 7 is connected through direct feedback lead 44 to input pin 6 and through the voltage divider circuit comprising the resistors R28, R29, R128 and R129 to pin 31 of the Intersil unit. In this manner, the input to the Intersil unit will be in the order of 0–1.4 volts and proportional to the DC output voltage corresponding to the measured sound level. The voltage value may be electronically held in the Intersil unit and visually displayed by the Hamlin unit in a digital readout in decibels with the maximum input of 1.4 volts being displayed as 140 dB. As should be understood, the above-described circuitry will function to continuously detect the sound of the surrounding area, convert the sound to a DC voltage equivalent of the sound decibel level and visually display the reading to an operator.

To advantage, a comparator 9A is wired such that input pin 3 thereof is connected through resistor R128 to output pin 7 of the voltage follower 2D and input pin 2 is connected through resistor R130 to a voltage divider comprising resistors R131 and R132. The voltage divider is connected to a +2.5 volt supply. With this arrangement, the voltage at input pin 2 is set at the voltage equivalent to a sound level of 40 dB. Pin 4 of the comparator 9A is connected to ground lead 11. The comparator 9A will function to provide an output at pin 1 thereof when the voltage at input pin 3 is less than the voltage at input pin 2, i.e., when the output of voltage follower 2D is less than the voltage equivalent to a measured sound level of 40 dB. When there is an output from the comparator 9A it wil be conducted through a diode D9 and resistor R51 to pin 1 of the 7116 unit to freeze the reading displayed by the Hamlin unit. Thus, the Hamlin unit will be held at a 40 dB reading in the event that the measured sound level falls below the 40 dB minimum of the sound meter of the invention.

In accordance with a significant feature of the invention, a comparator 7A is wired to function as the primary component for initiating the detect-and-hold sequence described above to detect and store the maximum noise generated by a passing motor vehicle or the like if such noise level goes above a predetermined threshold level. To this end, input pin 3 of the comparator 7A is wired through a resistor R30 and lead 57 directly to output pin 1 of summation amplifier 2C. Accordingly, the DC voltage equivalent to the measured sound level may be compared to a reference voltage equivalent to the selected threshold dB level, applied to pin 2 of the comparator 7A as follows.

A multiple position voltage divider switch S3 includes a terminal 150 connected through resistor R31, variable resistor R32 and leads 45 and 36 to lead 23 and the +15 volt supply. The opposite end terminal 151 of the switch S3 is connected to ground lead 11 and a series of resistors R33 to R39 are connected between the end terminals 150, 151 of switch S3 as illustrated to act as a voltage divider. The voltage divider will provide several output voltages at each of terminals 46–52 corresponding to one of seven different predetermined threshold levels. Switch contact 53 is mechanically operable to connect to any of the contacts 46 to 52 and is electrically connected to input pin 2 of comparator 7A. The switch contact 53 may also be switched to contact 54 whereby a variable threshold level may be fed through jack 55 and lead 56 directly to output pin 2 for use in connection with a sound test, for example, on a motorcycle, as will be described hereinafter. Moreover, an infinitely variable resistor may be used in place of the discrete step approach of the abovedescribed voltage divider. The infinitely variable resistor can preset to any threshold level (40–140 dB) by means of reading the level on the display.

To advantage, the contacts 46 to 52 may be set at voltages corresponding to sound levels of from 70 dB to 100 dB, respectively, in increments of 5 dB. As illustrated, switch contact 53 is connected to contact 46 which, in accordance with the above example, supplies a voltage equivalent to 100 dB to pin 2 of comparator 7A. Consequently, when a passing automobile generates noise levels above 100 dB, the voltage at pin 3 will exceed the voltage at pin 2 and the comparator 7A will be activated whereby an output voltage will be applied from output pin 1 of comparator 7A to input pin 6 of flip-flop 8A. This will activate flip-flop 8A causing an output voltage at pin 1 thereof which is connected to leads 58 and 59.

Lead 59 conducts the output voltage of flip-flop 8A through resistors R40 and R41 to input pin 5 of amplifier 9B. Input pin 6 of amplifier 9B is connected through capacitor C100 to lead 59 and through resistor R42 to output pin 7 to provide a feedback network. Pin 8 of amplifier 9B is connected through leads 60, 20 and 10 to the +12 volt terminal. An additional feedback network is provided between output pin 7 and input pin 5 through resistor R43.

Figure 1C:
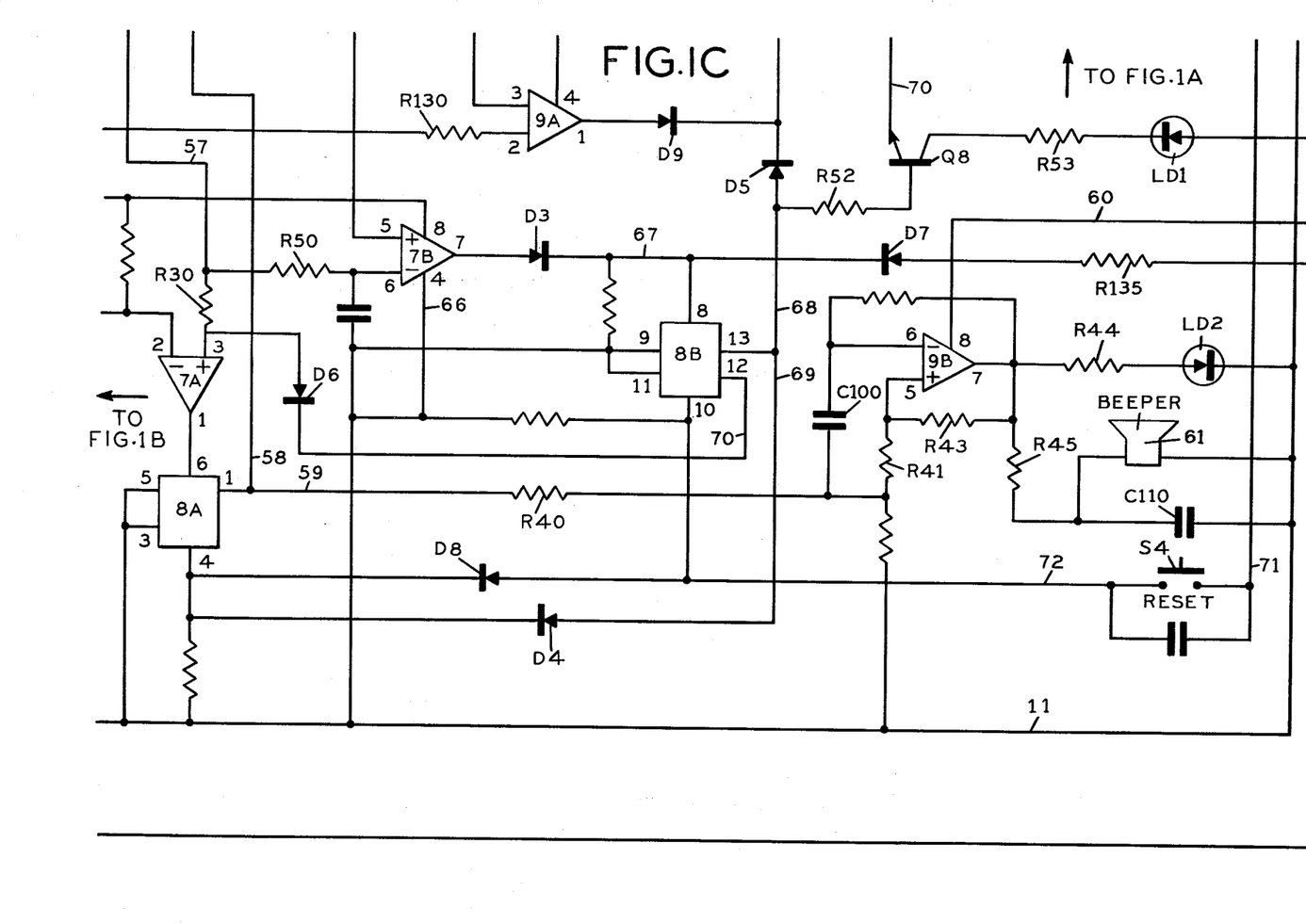

As can be seen in FIG. 1C, the output from amplifier 9B is conducted through resistor R44 to indicator lamp LD2, and through resistor R45 to an audio beeper 61. A capacitor C11 is wired in parallel to the audio beeper 61 and each of the indicator lamp LD2, audio beeper 61 and capacitor C110 are connected to ground lead 11. In this manner, when amplifier 9B is activated at the commencement of the detect-and-hold sequence by flip-flop 8A, it will energize the audio beeper 61 and indicator lamp LD2 to alert the operator to a possible violation of noise pollution regulations.

As stated above, the output from flip-flop 8A is also connected to lead 58 which conducts the output voltage from pin 1 of flip-flop 8A through a diode d2 to the gate of transistor Q5. This will, in accordance with the invention, switch the transistor Q5 to a non-conducting state and the RC circuit of resistor R27 and capacitor C9 will then be connected from ground lead 11 to three high impedance components, i.e., the now nonconducting transistor Q5, the non-conducting direction of diode D1 and the input pin 5 of amplifier 2D. Accordingly, the capacitor C9 will be charged through diode D1 to the highest voltage developed by summation amplifier 2C and will be unable to discharge to a lower voltage should the output of amplifier 2C decrease. Therefore, amplifier 2D will be continuously driven at a voltage equivalent to the highest sound level detected by the microphone during the detect-and-hold sequence and the Hamlin unit will display the maximum sound level generated by the passing automobile.

In accordance with the design of the preferred embodiment, the detect-and-hold sequence will be terminated when the voltage equivalent of the actual measured sound level is a predetermined level, e.g., 6 dB, below the maximum sound level equivalent voltage held by the RC circuit of resistor R27 and capacitor C9. To that end, the output of amplifier 2D is fed through resistor R46, the collector-emitter conduction path of transistor Q6 and resistor R47 to ground lead 11. The base of transistor Q6 is fed through resistor R48 to lead 23 and the +15 volt supply and through resistor R49 to ground lead 11 for proper biasing of the transistor Q5 whereby the collector-emitter conduction path is of a constant current state. A lead 65 is connected from a point between the resistor R46 and the collector of transistor Q6 to the input pin 5 of a comparator 7B.

Pin 4 of comparator 7B is connected through lead 66 to ground lead 11 and pin 8 is connected through leads 37, 45 and 23 to the +15 volt supply. Input pin 6 of the comparator 7B is connected through a resistor R50 to output pin 1 of summation amplifier 2C and, therefore, the voltage at input pin 6 will be proportional to the voltage equivalent of the actual sound level detected by the microphone. The resistance of resistor R46 is such that the voltage drop across the resistor R46 will provide a voltage at input pin 5 proportional to a value which is 0.3 volts (or 6 dB) below the maximum sound level equivalent voltage held by the RC circuit of resistor R27 and capacitor C9.

In accordance with the invention, there is normally no output voltage from pin 7 of comparator 7B. However, when the voltage at pin 6 is less than the voltage at pin 5, that is, when the actual sound level is more than 6 dB below the maximum sound level held by the RC circuit of R27 and capacitor C9, the comparator 7B is switched on and the output from pin 7 is fed through a diode D3 and lead 67 to input pin 8 of a flip-flop circuit 8B. At such time, output pin 13 of flip-flop 8B will apply a voltage to each of leads 68 and 69.

Lead 69 is connected through diode D4 to pin 4 of flip-flop circuit 8A and the voltage applied to pin 4 will act to reset the flip-flop circuit 8A, thereby switching off the output from pin 1 thereof. Lead 68 is connected through a diode D5 and resistor R51 to pin 1 of the Intersil 7116 unit. Application of a voltage to pin 1 acts to store the decibel information corresponding to the maximum sound generated by the passing vehicle in the 7116 unit. Lead 68 is also connected through resistor R52 to the base of a normally non-conducting transistor Q8. The emitter of the transistor Q8 is connected through lead 70 to ground lead 11 and the collector is wired through a resistor R53 and light LD1 to lead 60 which is connected to the +12 volt source through leads 20 and 10. When the flip-flop 8B is activated, the voltage from pin 13 will be applied through lead 68 and the resistor R52 to the base of the transistor Q8 to switch the transistor Q8 into a conducting state. This will close a circuit through the light LD1. Thus, the light LD1 will be energized to indicate to the operator that the detect-and-hold sequence has been completed and that the digital readout on the Hamlin unit is the maximum noise level above the threshold caused by the passing motor vehicle.

Moreover, when the flip-flop circuit 8B is activated, pin 12 thereof will provide an electrical conductive by-pass through lead 70 and diode D6 from input pin 3 of the comparator 7A to insure that the voltage at pin 3 will not exceed the predetermined threshold level to activate the comparator 7A output. This will prevent the commencement of another detect-and-hold sequence until the entire unit is reset. To that end, a normally open, push-button reset switch S4 is wired between leads 71 and 72. Lead 71 is connected through resistor R134 to lead 23 and the +15 volt supply, and lead 72 is connected to pin 10 of flip-flop 8B and through a diode D8 to pin 4 of flip-flop 8A. Accordingly, when the reset button is closed, a positive DC voltage will be applied to each of flip-flops 8A and 8B to reset these components whereby the circuit of the invention will once again function as a continuous range dynamic sound meter.

The detect-and-hold sequence may also be terminated by a pre-selected voltage applied to the unit through jack 74. Lead 73 connects jack 74 through resistor R135 and diode D7 to pin 8 of flip-flop 8B. In this manner, the flip-flop 8B may be activated at any time by the pre-selected voltage applied at jack 74. The jacks 55, 74 may be used in, for example, a motorcycle bench test where the maximum sound generated by the motorcycle during a predetermined RPM range of the motorcycle engine may be measured. A predetermined threshold voltage equivalent to the sound generated by the motorcycle at the lowest value of the RPM range may be applied to jack 55 whereby this voltage is conducted to input pin 2 of the comparator 7A when the switch contact 53 of switch S3 is connected to terminal 54. Therefore, the detect-and-hold sequence will commence when the motorcycle engine reaches the lowest value of RPM range.

A second predetermined voltage equivalent to the sound level generated by the motorcycle at the highest RPM value of the RPM range may be applied to jack 74 whereby the detect-and-hold sequence will be terminated when the motorcycle is operating at said highest RPM value. Thus, the reading on the Hamlin unit at the end of the detect-and-hold sequence will be the highest sound level generated by the motorcycle while operating within the predetermined RPM range. Of course, the voltages applied at the jacks 55, 74 may be of any suitable value to commence and terminate the detect-and-hold sequence in accordance with a particular sound test which the operator may desire to conduct.

Thus, the present invention provides a novel circuit means which is responsive to impermissible noise levels and which acts to detect and store the maximum sound level above the violative threshold level produced by the passing automobile. Moreover, the present invention will function to measure a decrease in the sound level detected below the maximum stored value by a predetermined amount set in accordance with regulations to verify that the target vehicle caused the violation and that the sound environment around the meter returns to its prior state. The transistor, diode coupling means between the output of the summation amplifier 2C and the input to the voltage follower 2D and the associated RC circuit of resistor R27 and capacitor C9 comprise a novel and straightforward means for conducting the voltage equivalent decibel information during normal sound meter operation of the circuit while forming an electrical storage means in response to the operation of the comparator 7A and the flip-flop 8A to hold the maximum sound level detected during a detect-and-hold sequence.

In addition, the major operating components of the invention comprise standard, commercially available integrated circuit chips and other readily available components to greatly simplify the manufacture of the sound meter. The numerous features and automatic operation of the meter represent a significant advance in the policing of noise violations. In the operation of the device, the meter may be wired to the battery of a police vehicle and set up on the dashboard for observation of the digital readout by the enforcement officer. When a noise above the threshold level is generated, the beeper will alert the officer to the commencement of a detect-and-hold sequence and an indicator light will be activated at the end of the sequence to indicate a valid violation. The unit may be reset to normal sound meter operation by simply pressing the reset button S4.

It should be understood, of course, that the specific form of the invention described and illustrated herein is intended to be representative only, as certain changes may be made therein without departing from the clear teachings of the disclosure. Accordingly, reference should be made to the following appended claims in determining the full scope of the invention.

I claim:
1. A sound level detection system, which comprises
   (a) sound level measuring means generating an electrical output corresponding to the measured sound level,
   (b) measured sound information means associated with said sound level measuring means,

(c) circuit means interconnecting said information means and said sound level measuring means, (d) said circuit means being operative in a plurality of conducting states, including at least a first conducting state acting to transmit said output to said information means, and a second conducting state acting to continuously, electrically store the maximum output generated by said sound level measuring means when said circuit means is operative in said second conducting state and to transmit said maximum output to said information means, and (e) said circuit means comprising an electrical conducting means and an electrical storage means connected thereto, (f) said electrical conducting means and said electrical storage means being operative together when said circuit means is in said second conducting state whereby said storage means continuously stores the maximum output generated by said sound level measuring means, (g) a comparator means for comparing a predetermined threshold value with the output of said sound level measuring means and being operative when said output exceeds said predetermined threshold value to switch said circuit means from said first conducting state to said second conducting state whereby said maximum output generated by said sound level measuring means and stored in said electrical storage means during the time said circuit means is operating in said second conducting state is continually transmitted to said sound information means.

2. The sound level detection system according to claim 1, further characterized by (a) said sound information means comprising an electronic digital display means.

3. A sound level detection system, which comprises (a) sound level measuring means providing an electrical output corresponding to the measured sound level, (b) measured sound information means associated with said sound level measuring means, (c) circuit means interconnecting said information means and said sound level measuring means, (d) said circuit means being operative in a plurality of conducting states, including at least a first conducting state acting to transmit said output to said information means, and a second conducting state acting to continuously, electrically store the maximum output from said sound level measuring means and to transmit said maximum output to said information means, (e) a comparator means for comparing a predetermined threshold value with the output of said sound level measuring means and being operative when said output exceeds said predetermined threshold value to switch said circuit means from said first conducting state to said second conducting state whereby the maximum sound level above the predetermined threshold is continually transmitted to said sound information means, and (f) a second comparator means for comparing said output from the sound level measuring means with said maximum stored output and being operative when said output is more than a predetermined amount below said maximum stored output to lock said maximum stored output value in said information means.

4. The sound level detection system according to either claims 1 or 3, further characterized by (a) said circuit means including a diode and a transistor wired in parallel between said sound level measuring means and said information means for transmitting said output to said information means, (b) the conducting direction of said diode being from said sound level measuring means to said information means, (c) said transistor being in a conducting state in the first conducting state of said circuit means and in a non-conducting state in the second conducting state of said circuit means, (d) said comparator means being operative to switch said transistor from said conducting state to said non-conducting state, and (e) electrical storage means associated with said transistor and being electrically chargeable to hold the maximum output from said sound level measuring means when said transistor is in said non-conducting state.

5. The sound level detection system according to claim 4, further characterized by (a) said comparator being electrically connected to the base of said transistor and being operative to apply a signal to the base to switch the transistor into said non-conducting state when said output exceeds said predetermined threshold value.

6. The sound level detection system according to claim 5, further characterized by (a) said electrical storage means comprising a resistor and capacitor wired in series with one another and wired between said parallel wired diode and transistor and said information means, (b) whereby said capacitor will be charged to the output of said sound level measuring means and will hold the maximum output when said transistor is in said nonconducting state thereby holding said information means at said maximum output.

7. The sound level detection system according to claim 3, futher characterized by (a) a flip-flop circuit means electrically connected to said comparator means whereby when said output exceeds said predetermined threshold level, said comparator means will activate said flip-flop circuit means to be in an on condition, (b) said flip-flop circuit means being electrically connected to said circuit means interconnecting the information means and the sound level measuring means whereby the on condition of said flip-flop circuit means will switch said interconnecting circuit means from said first conducting state to said second conducting state.

8. The sound level detection system according to claim 7, further characterized by (a) a second flip-flop circuit means connected to said second comparator means whereby operation of said second comparator means will activate said second flip-flop circuit means to be in an on condition, (b) said second flip-flop circuit means being electrically connected to said other flip-flop circuit means and to said information means whereby the on condition of said second flip-flop circuit means will operate to reset said other flip-flop circuit means and to lock said information means in its then current state.

9. The sound level detection system according to claim 8, further characterized by
  (a) said flip-flop circuit means being connected to an indicator means, and
  (b) said indicator means being activated by said flip-flop circuit means when the flip-flop circuit means is in the on condition to indicate that said interconnecting circuit means is operating in said second conducting state.

10. The sound level detection system according to claim 9, further characterized by
  (a) said second flip-flop circuit means being connected to a second indicator means, and
  (b) said second indicator means being activated when said second flip-flop circuit means is in the on condition to indicate that said information means is in the locked condition.

11. A sound level detection system which comprises
  (a) sound level measuring means providing an electrical output corresponding to the measured sound level,
  (b) sound information means associated with said sound level measuring means,
  (c) electrical storage means associated with said sound information means,
  (d) circuit means interconnecting said sound level measuring means, said sound information means and said electrical storage means,
  (e) said circuit means being operative in a plurality of conducting states including at least a first conducting state acting to transmit said output to said information means and a second conducting state being operative to activate said electrical storage means to store the maximum output from said sound level measuring means, and
  (f) a first comparator means for comparing a predetermined threshold value with the output of said sound level measuring means and being operative when said output exceeds said predetermined threshold value to switch said interconnecting circuit means from said first conducting state to said second conducting state,
  (g) said electrical storage means being operative to transmit the stored maximum output to said sound information means,
  (h) a second comparator means for comparing the stored maximum output with the output of said sound level measuring means and being operative when the value of said output is a predetermined portion of the value of said stored maximum output to hold said stored maximum output in said sound information means.

12. A sound level detection system, which comprises:
  (a) sound level measuring means providing an electrical output corresponding to the measured sound level,
  (b) measured sound information means associated with said sound level measuring means,
  (c) circuit means interconnecting said information means and said sound level measuring means,
  (d) said circuit means being operative in a plurality of conducting states, including at least a first conducting state acting to transmit said output to said information means, and a second conducting state acting to continuously, electrically store the maximum output from said sound level measuring means and to transmit said maximum output to said information means,
  (e) a comparator means for comparing a predetermined threshold value with the output of said sound level measuring means and being operative when said output exceeds said predetermined threshold value to switch said circuit means from said first conducting state to said second conducting state whereby the maximum sound level above the predetermined threshold is continually transmitted to said sound information means, and
  (f) means to generate said predetermined threshold value comprising a voltage divider element including several output contacts, each providing a different threshold value voltage,
  (g) said comparator means being selectively electrically connected to one of said output contacts whereby the output of said sound level measuring means may be compared to a pre-selected threshold value.

* * * * *